Oct. 3, 1961     F. K. CHAPMAN     3,002,301
LAND SURFACE SHAPER
Filed Nov. 16, 1959     3 Sheets-Sheet 1
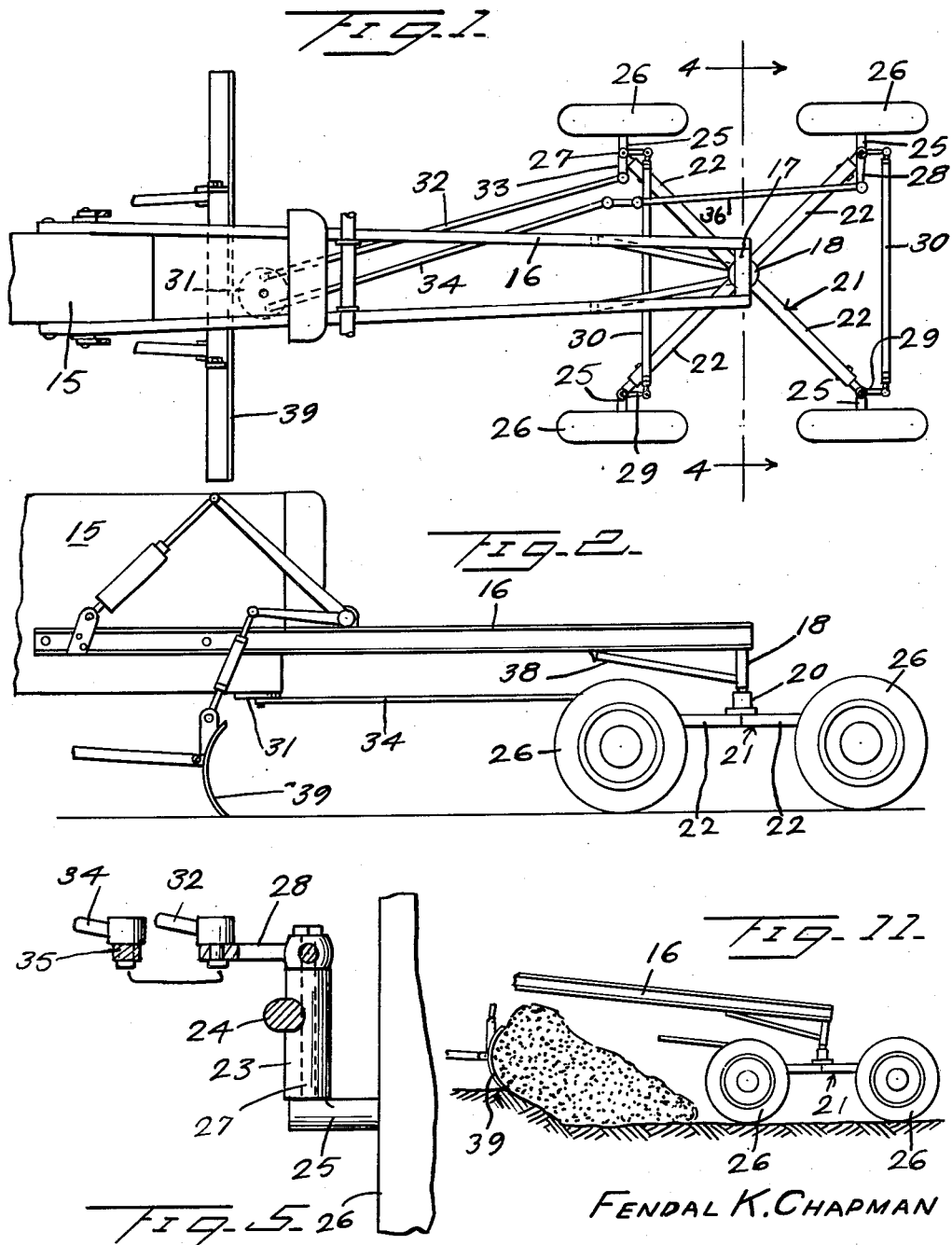
FENDAL K. CHAPMAN
INVENTOR
BY *C. A. Snow & Co.*
ATTORNEYS.

Oct. 3, 1961　　　F. K. CHAPMAN　　　3,002,301
LAND SURFACE SHAPER
Filed Nov. 16, 1959　　　　　　　　　3 Sheets-Sheet 2
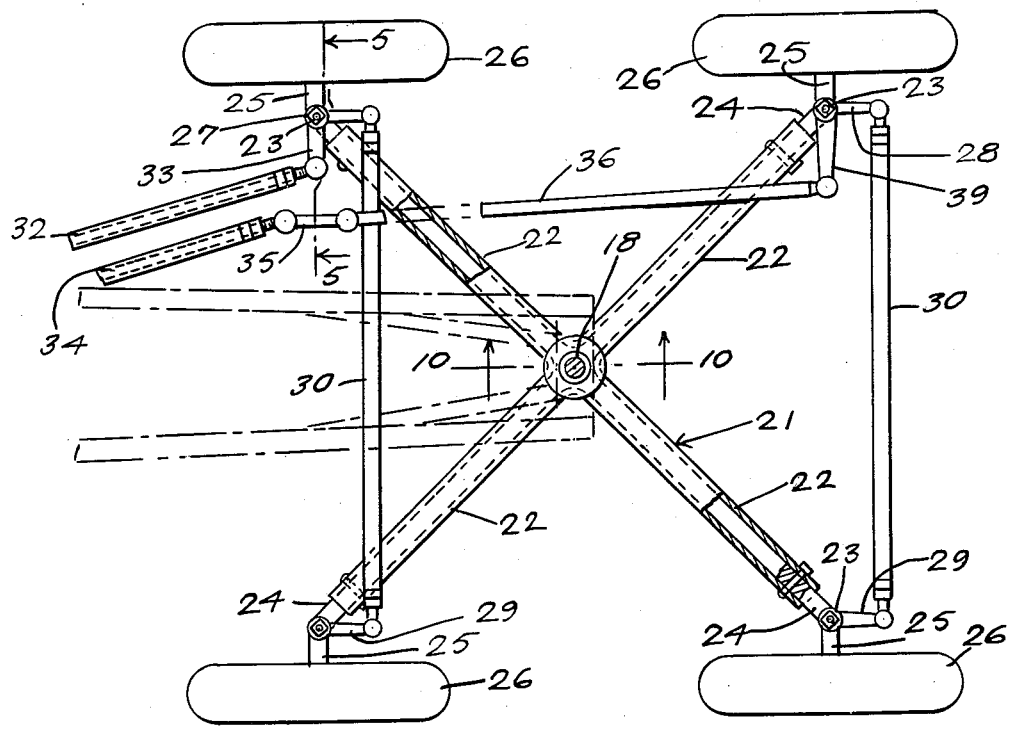
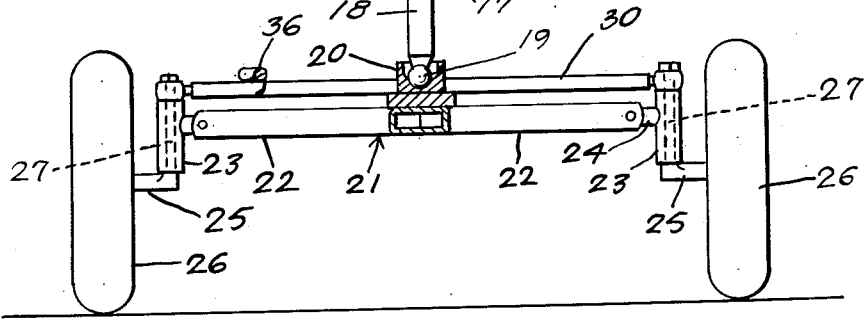
FENDAL K. CHAPMAN
INVENTOR
BY　*C. A. Snow & Co.*
ATTORNEYS.

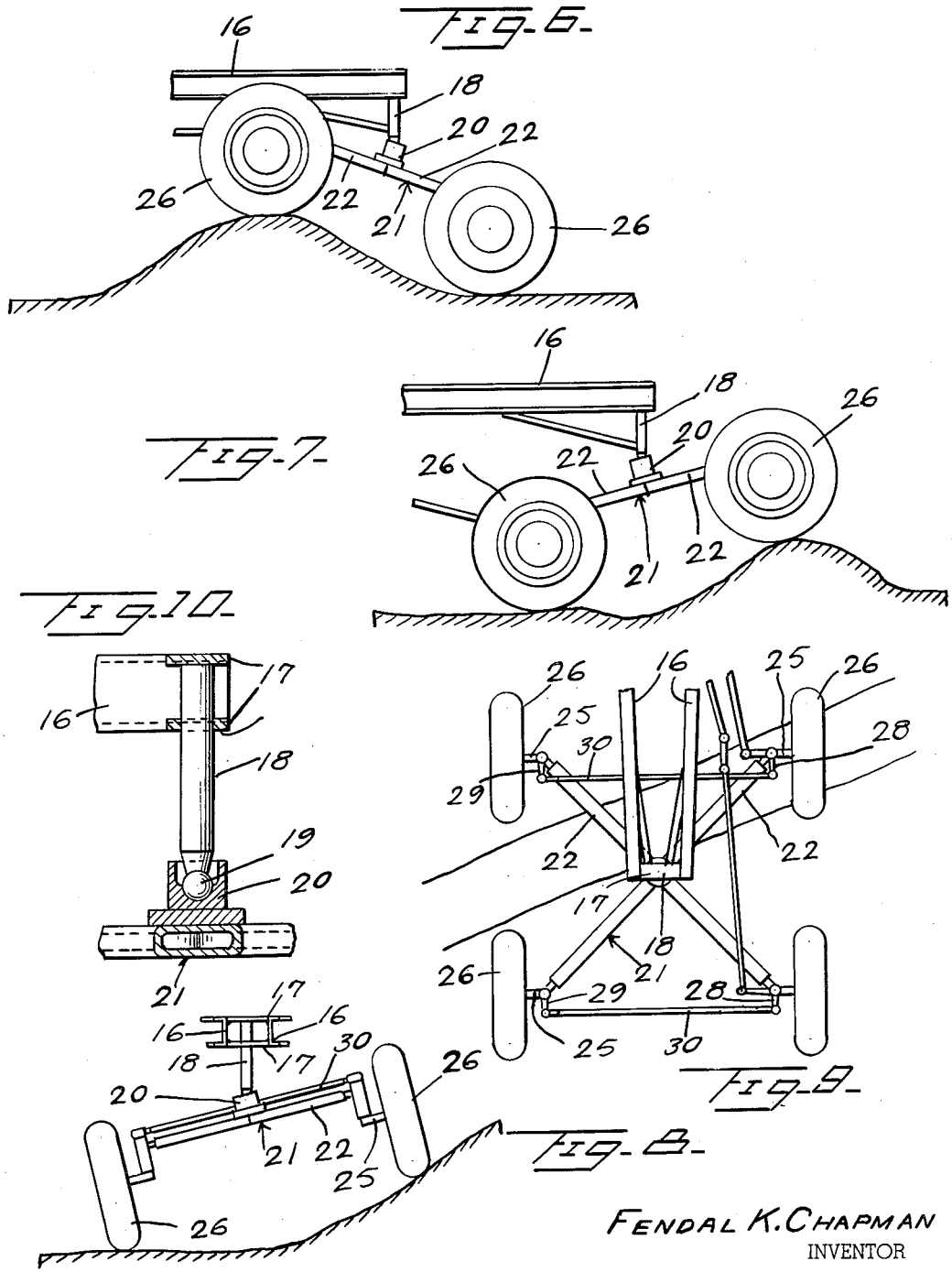

3,002,301
LAND SURFACE SHAPER
Fendal K. Chapman, Hickory Ridge, Ark., assignor to Allied Companies, Inc., North Little Rock, Ark.
Filed Nov. 16, 1959, Ser. No. 853,306
3 Claims. (Cl. 37—155)

This invention relates to tractors and the like, and more particularly to that form of tractor or attachment to tractors known as land surface shapers.

It is well known to those experienced in the art of conditioning land surfaces for highways, farm land or other purposes where it is desirable to level irregularities, that difficulty is experienced in steering the shaper by reason of deflection of the frame and steering mechanism as the wheels pass over the variable contour of the land surface.

It is therefore an object of this invention to provide a land surface shaper having its front end, front wheel supporting mechanism and steering mechanism so constructed as to minimize the effect on the carriage as the wheel passes over the irregular land surface.

A further object of this invention is to provide a land surface shaper having its front wheels and shaper mounted ahead of the power plant and operator, thereby not only placing most of the weight of the shaper on its rear wheels, but also providing better traction, which in turn will improve its maneuverability.

Another object of this invention is to provide a land surface shaper with its blade mounted so far ahead of the rear wheels that the latter always remain on solid ground when filling in a depression or the like, thereby enabling the machine to back up and maneuver in order to obtain another scraper full of dirt to push forward into the depression, thus providing the apparatus with a form of maneuverability that is virtually impossible to obtain with dirt drawn moving equipment.

Still another object of this invention is to provide a land surface shaper that may be readily attached to any tractor by those experienced in the art, or by mechanics in related arts, in a minimum of time and without special tools.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

FIGURE 1 is a plan view of this invention, not showing the power plant and rear wheels.

FIG. 2 is a side view of FIG. 1.

FIG. 3 is an enlarged plan view of the front wheels and attaching mechanism of this invention.

FIG. 4 is a sectional view taken substantially along the line 4—4 of FIG. 1 as viewed in the direction indicated by the arrows.

FIG. 5 is a sectional view taken substantially along the line 5—5 of FIG. 3 as viewed in the direction indicated by the arrows.

FIG. 6 is a side view of the front wheels of this invention as they appear on entering a depression or going over a bump of land surface.

FIG. 7 is a side view of the front wheels of this invention showing them leaving a depression, or climbing over a bump or pile of dirt.

FIG. 8 is a front view of the wheels and attaching mechanism when they are resting in a laterally inclined depression or gully.

FIG. 9 is a top plan view of the front wheels of this invention as they appear when they cross a ridge or gully.

FIG. 10 is a sectional view taken substantially along the line 10—10 of FIG. 3 as viewed in the direction indicated by the arrows.

FIG. 11 is a side view of the front portion of this invention showing it filling in a depression.

Similar reference characters refer to similar parts throughout the several views of the drawings.

Having reference now to the drawings in detail, and in particular to FIGS. 1 and 3, there is generally indicated by the reference character 15 a tractor or similar type of vehicle to which is secured a pair of horizontally extending front wheel supports 16 that are fabricated from structural steel channels and are toed slightly inward to their front extremity, where they are connected together by a pair of horizontal and vertically spaced plates 17, the bottom one of which has an opening for the passage of support rod 18 which has a concave lower end for the reception of a ball 19 resting in a cup 20, which in turn is secured to the center of an axle support member 21 which has the configuration of a letter X when viewed in plan form. The support members 21 embody four tubular members 22, each of which has a vertical member 23 secured at the outermost end thereof by means of a stub shaft 24. A stub axle 25 is rotatably secured to each wheel 26 as clearly shown in FIGS. 4 and 5 of the drawings. The axles 25, as clearly shown in FIGS. 4 and 5, are attached to the vertical support member 23 by means of a rod 27 passing through the center of the same. An L-shaped lever 28 is bolted to the top of each of the two aforesaid rods 27 on the lefthand side of the machine, while an arm 29 is bolted to the top of each of the aforesaid rods 27 on the righthand side of the machine, as can be seen in FIGS. 1, 3 and 9, where it will also be seen that each of the stated arms are swivelly connected to one of the L-shaped levers 28 on the opposite side of the machine by means of a connecting rod 30.

Again considering FIG. 1, it is observed that on the under side of the tractor there is a disc 31 centrally pivoted to the spring mechanism of the vehicle, having one end of a steering rod 32 pivotally secured thereto, while the other end of the same rod is pivotally secured to end 33 of the rearmost of the stated L-shaped levers 28. A second steering rod 34 also has one end pivotally secured to the stated disc 31, while its other end is pivotally connected to a steering link 35 which in turn is pivotally connected to a push-pull rod 36 which has its forward end pivotally secured to end 37 of the foremost of the L-shaped levers 28.

The description of the construction of this invention is now complete with the exception of a pair of brace members 38 that give additional rigidity to the previously described support rod 18 from the under side of the wheel support 16, as clearly shown in FIGS. 2 and 4 of the drawings.

The mechanism for supporting and operating the scraper 39 is not described, since it does not form a part of the invention, and is typical of the average land surface scraper. It is obvious from an examination of FIGS. 6, 7, 8, 9 and 11, that this land surface shaper will negotiate any kind of terrain with little or no difficulty by reason of the fact that its front wheels 26 are supported by the X-shaped member 21, which in turn is supported by the ball 19 in cup 20 in the center of the stated support member 21, as has been previously described, and which needs no additional clarification when the aforesaid figures of the drawings are examined as the specification is read.

From the foregoing it will now be seen that there is herein provided an improved land surface shaper which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

What is claimed is:

1. A land surface grading machine comprising, in combination, a tractor vehicle, a pair of horizontal channel members, each connected at one end to said tractor and extending longitudinally therefrom, vertically aligned upper and lower plates connecting the free ends of said channel members, a vertical rod extending through said lower plate and secured to said upper plate at one end and terminating at its other end as a ball member, a wheel supporting frame including a pair of tubular members crossed at a point intermediate their ends, a bearing block fixed to said wheel supporting frame at the crossing point of said tubular members, wall portions of said bearing block defining a socket in which said ball member resides to provide universal movement of said wheel supporting frame, and a scraper blade adjustably mounted on said channel members.

2. A land surface grading machine as defined in claim 1 wherein said wheel supporting frame further includes vertically disposed bushings secured to the ends thereof, substantially L-shaped axle members having wheels rotatably secured to the horizontal portion thereof and the vertical portion pivotally secured in said bushings.

3. A land surface grading machine as defined in claim 2 which further includes means interconnecting said pivotally secured axle members whereby pivotal movement of one causes equal pivotal movement of the others.

References Cited in the file of this patent

UNITED STATES PATENTS

| 1,584,862 | Johnston | May 18, 1926 |

FOREIGN PATENTS

| 63,461 | Norway | Apr. 28, 1941 |
| 933,973 | France | Jan. 7, 1948 |